United States Patent
Lucas et al.

(10) Patent No.: US 12,333,381 B2
(45) Date of Patent: Jun. 17, 2025

(54) QUANTUM STATE TRANSFER

(71) Applicants: The Regents of the University of Colorado, a body corporate, Denver, CO (US); GOVERNMENT OF THE UNITED STATES OF AMERICA, AS REPRESENTED BY THE SECRETARY OF COMMERCE, Gaithersburg, MD (US); California Institute of Technology, Pasadena, CA (US); University of Maryland, College Park, College Park, MD (US); Colorado School of Mines, Golden, CO (US)

(72) Inventors: Andrew Lucas, Boulder, CO (US); Minh Tran, College Park, MD (US); Adam E. Ehrenberg, University Park, MD (US); Andrew Y. Guo, College Park, MD (US); Abhinav Deshpande, College Park, MD (US); Alexey Vyacheslavovich Gorshkov, Rockville, MD (US); Zhexuan Gong, Arvada, CO (US); Chi-Fang Chen, Pasadena, CA (US); Yifan Hong, Boulder, CO (US)

(73) Assignees: The Regents of the University of Colorado, a body corporate; Government Of The United States Of America, As Represented By The Secretary Of Commerce; California Institute of Technology; University of Maryland, College Park; Colorado School of Mines

( * ) Notice: Subject to any disclaimer, the term of this patent is extended or adjusted under 35 U.S.C. 154(b) by 794 days.

(21) Appl. No.: 17/574,301

(22) Filed: Jan. 12, 2022

(65) Prior Publication Data
US 2022/0222563 A1 Jul. 14, 2022

Related U.S. Application Data

(60) Provisional application No. 63/136,385, filed on Jan. 12, 2021.

(51) Int. Cl.
*G06N 10/20* (2022.01)

(52) U.S. Cl.
CPC .................................. *G06N 10/20* (2022.01)

(58) Field of Classification Search
CPC ..................................................... G06N 10/20
(Continued)

(56) References Cited

U.S. PATENT DOCUMENTS 10,432,320 B2    10/2019   Gorshkov et al.
2019/0393400 A1* 12/2019   Leipold ............... H10D 62/121
(Continued)

FOREIGN PATENT DOCUMENTS

EP    3817275 B1 *  12/2024   ......... H04B 10/2581

OTHER PUBLICATIONS

Muschik, et al., "Quantum Processing Photonic States in Optical Lattices", arXiv.quant-ph/0611093v4 Jan. 31, 2007, 4pages.
(Continued)

*Primary Examiner* — Ruay Ho
(74) *Attorney, Agent, or Firm* — Cozen O'Connor (57) ABSTRACT

A method for quantum state transfer includes iteratively expanding an initial quantum state from an initial qudit, of a plurality of qudits, over a sequence of expanding domains. For each iteration, a quantum circuit is applied to the qudits belonging to a respective domain of the sequence. The quantum circuit transforms the qudits of the respective
(Continued)

domain into an intermediate quantum state that includes a W state formed with the qudits of the respective domain. The last iteration generates a maximally expanded state. The method may also include iteratively compressing the maximally expanded state according to a sequence of contacting domains. After compressing, a final qudit, of the plurality of qudits, is in a final quantum state that approximates the initial quantum state.

20 Claims, 4 Drawing Sheets

(58) Field of Classification Search
USPC .......................................................... 706/62
See application file for complete search history.

(56) References Cited

U.S. PATENT DOCUMENTS

| 2020/0003925 | A1* | 1/2020 | Leipold | G06N 10/20 |
| 2020/0161456 | A1* | 5/2020 | Leipold | H10D 64/27 |
| 2020/0227523 | A1* | 7/2020 | Leipold | H10D 64/27 |
| 2020/0409232 | A1* | 12/2020 | Weiner | G06N 10/20 |
| 2022/0230761 | A1* | 7/2022 | Harris | H10N 99/05 |

OTHER PUBLICATIONS

Eldredge, et al., "Fast State Transfer and Entanglement Renormalization Using Long-Range Interactions", arXiv:1612.02442v2 [quant-ph] Sep. 22, 2017, 10 pages.

* cited by examiner

QUANTUM STATE TRANSFER

RELATED APPLICATIONS

This application claims priority to U.S. Provisional Patent Application No. 63/136,385, filed Jan. 12, 2021 and titled "Fast Free-Particle Quantum State Transfer", which is incorporated herein by reference in its entirety.

STATEMENT REGARDING FEDERALLY SPONSORED RESEARCH OR DEVELOPMENT

This invention was made with government support under grant number CCF-1839232 awarded by the National Science Foundation, and grant number DESC0019040 awarded by the Department of Energy. The government has certain rights in the invention.

BACKGROUND

The W state and Greenberger-Horne-Zeilinger (GHZ) states are two types of quantum states that entangle three qubits and can be generalized to a greater number of entangled qubits. The W state differs from the GHZ state in that if one of the qubits is lost, the remaining qubits are still entangled. On the other hand, loss of one qubit from a GHZ state causes the remaining qubits to become separable. For this reason, W states are viewed as being more robust to particle loss than GHZ states.

SUMMARY

High-fidelity quantum state transfer can be used to build fast remote quantum gates, which can significantly speed up large-scale quantum computation. There is a growing interest in designing fully-connected quantum computers that take advantage of long-range interactions among physical qubits. Finding optimal quantum state-transfer protocols using such long-range interactions is a crucial part of their design.

The present embodiments include a quantum state transfer protocol for spatially transferring a quantum state from a first particle of a multi-partite quantum system to a second particle of the multi-partite quantum system. The protocol works by successively spreading a particle over larger and larger regions of a lattice. The number of lattice sites supporting the particle increases exponentially with the iteration number. Specifically, after the kth iteration of the protocol at time $t_k$, an operator $c_0^\dagger$ originally supported at the origin becomes $$c_0^\dagger(t_k) \propto \sum_{\text{sites } x \text{ in a cube of length } O(2^k)} c_x^\dagger,$$

After spreading the particle to a square large enough to cover both the origin and the target site, the protocol may then be reversed to compress the particle onto the target site.

One advantage of the quantum state transfer protocol, as compared to prior-art protocols, is that it takes place in a constrained subspace of a many-body Hilbert space that is naturally realized in atomic platforms with a conserved magnetization. Accordingly, the present embodiments can be readily implemented in many-body quantum systems having a conserved quantity. For example, in a spin system with z-spin conservation, the quantum system can be prepared in a highly polarized state with a single up-spin; the location of the up spin represents the location of the single quantum degree of freedom, and the state-transfer protocol of the present embodiments can be immediately applied. In trapped ion crystals, it is natural to use a large transverse magnetic field to help restrict to this subspace.

Another advantage of the present embodiments is reduced decoherence rates in the single-particle subspace. This improvement in decoherence comes from creating a series of intermediate W states. By contrast, prior-art quantum state transfer protocols utilize Greenberger-Horne-Zeilinger (GHZ) states. As an example of such a prior-art protocol, see U.S. Pat. No. 10,432,320. Also see Z. Eldredge et al., "Fast Quantum State Transfer and Entanglement Renormalization Using Long-Range Interactions", Phys. Rev. Lett. 119, 170503 (2017).

Another advantage is that the protocol is extraordinarily robust to perturbations in the Hamiltonian, a desirable feature on account of the low-precision of tunable couplers used in present quantum information processors.

The present embodiments may be implemented with any number of physical quantum systems, including qubits and other types of quantum particles and devices. In particular, these physical implementations can be divided into at least three categories. The first category covers any many-body system in which the constituent quantum particles are, or approximate, two-level spins. In this category, XX+YY interactions between two spins transform the two-qubit state $|10\rangle$ into $|10\rangle$ (and vice versa) while leaving the states $|00\rangle$ and $|11\rangle$ unaffected. Almost all qubits used for quantum computing and information processing fall into this first category. Examples include, but are not limited to, ultracold atoms, Rydberg atoms, polar molecules, atomic ions, molecular ions, atomic nuclei, electrons, defects in diamond, and superconducting qubits (e.g., phase, charge, and flux qubits).

The second category of physical implementation covers any multi-partite quantum system that is, or approximates, a free boson system. Examples of free boson systems include, but are not limited to, bosonic ultracold atoms with negligible interactions and arrays of coupled cavities, such as microwave cavities (e.g., superconducting) or optical cavities.

The third category of physical implementation covers any multi-partite quantum system that is, or approximates, a free fermion system. Examples of free fermion systems include, but are not limited to, fermionic ultracold atoms and spin-polarized electrons.

In embodiments, a method for quantum state transfer includes iteratively spreading an initial quantum state from an initial qudit, of a plurality of qudits, over a sequence of expanding domains. Each iteration of said iteratively spreading includes applying a quantum circuit to the plurality of qudits belonging to a respective expanding domain of the sequence of expanding domains. The quantum circuit transforms the qudits of the respective expanding domain into an intermediate quantum state comprising a superposition of terms, at least one of the terms approximating a W state formed with the qudits of the respective expanding domain.

DETAILED DESCRIPTION

Figure 1:
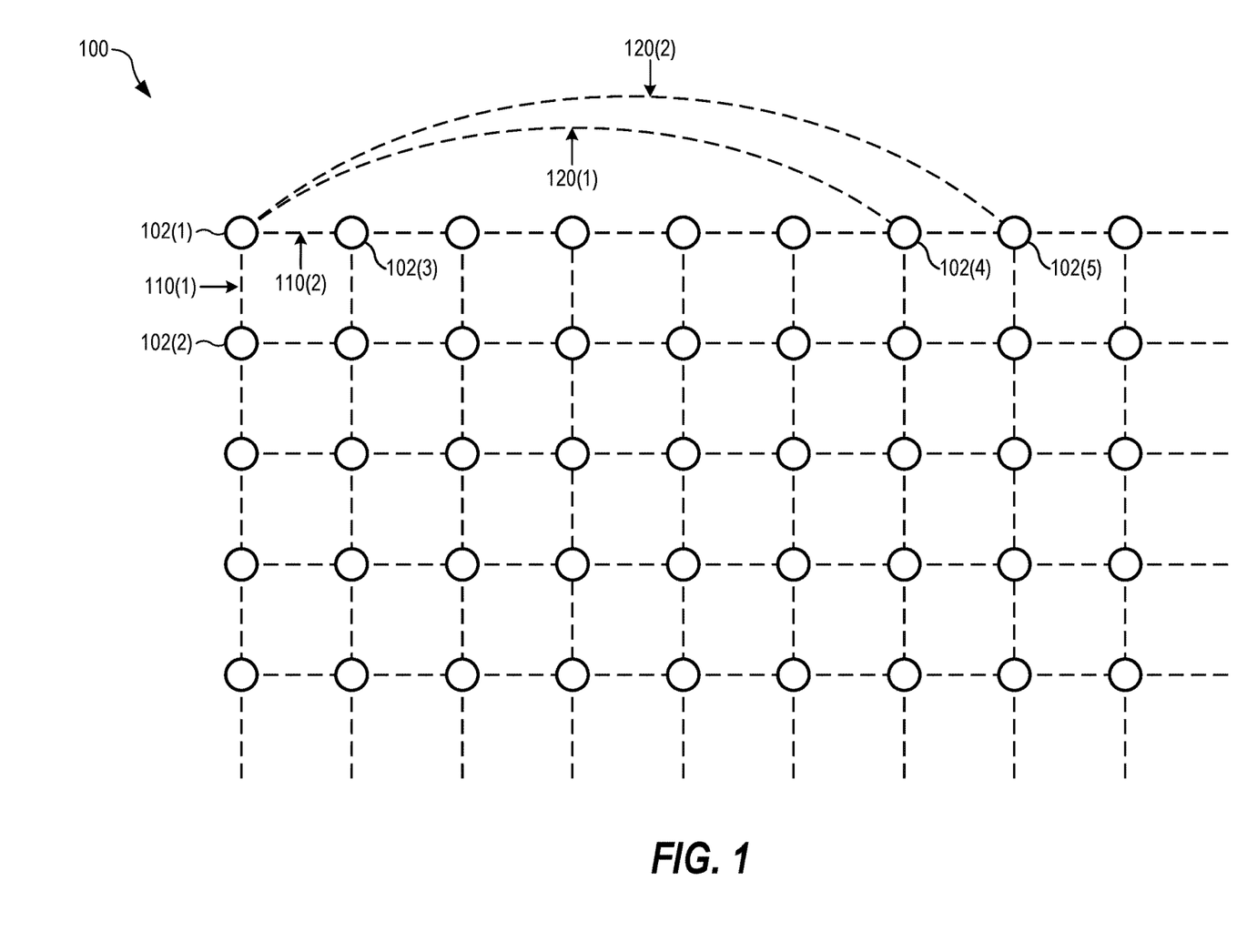
FIG. 1 illustrates a multi-partite quantum system that may be used with the present embodiments.

FIG. 1 illustrates a multi-partite quantum system 100 that may be used with the present embodiments. The quantum system 100 is formed from qudits 102 that are coupled to each other via nearest-neighbor couplings 110 and long-distance couplings 120. Each of the couplings 110 and 120 is a direct two-body coupling, where the term "direct" means that the coupling involves only two of the qudits 102 and no intermediary qudit. The positions of the qudits 102 in FIG. 1 approximately correspond to their positions in physical space. Thus, the qudits 102 in FIG. 1 form a two-dimensional cubic lattice. More specifically, one qudit 102 is located at each site of the cubic lattice. However, the qudits 102 may form another structure without departing from the scope hereof. Examples of such alternative structures includes a lattice of a different dimension (e.g., one or three), a different type of lattice (e.g., triangular, hexagonal, rectangular, etc.), a structure with irregular spacings between the qudits 102, and combinations thereof.

Each of the nearest-neighbor couplings 110 couples one of the qudits 102 to one of the qudits 102 to which it is physically closest. For example, in FIG. 1 a first nearest-neighbor coupling 110(1) couples a first qudit 102(1) with a second qudit 102(2). Similarly, a second nearest-neighbor coupling 110(2) couples the first qudit 102(1) with a third qudit 102(3). The qudits 102(2) and 102(3) are the two qudits physically closest to the first qudit 102(1), and are therefore nearest-neighbor qudits with respect to the first qudit 102(2). As shown by this example, it is possible for a qudit to have more than one nearest-neighbor qudit. For clarity in FIG. 1, only the nearest-neighbor couplings 110(1) and 110(2) are labeled. However, the dashed lines in FIG. 1 indicate many other nearest-neighbor couplings.

Each of the long-range couplings 120 couples one of the qudits 102 to another qudit that is not a nearest-neighbor qudit. For example, in FIG. 1 a first nearest-neighbor coupling 120(1) couples the first qudit 102(1) with a fourth qudit 102(4) and a second nearest-neighbor coupling 120(2) couples the first qudit 102(1) with a fifth qudit 102(5). As can be seen, the qudits 102(4) and 102(5) are not nearest-neighbor qudits with respect to the first qudit 102(1).

Each of the couplings 110 and 120 can be represented as a term in the Hamiltonian of the quantum system 100. The term may include a coupling strength that quantifies its contribution to the Hamiltonian. While FIG. 1 only shows direct two-body couplings, those skilled in the art will recognize that the quantum system 100 may alternatively or additionally include direct higher-order couplings (e.g., three-body couplings that directly involve three of the qudits 102, four-body couplings that directly involve four of the qudits 102, etc.).

The quantum system 100 also includes indirect couplings between the qudits 102. Here, the term "indirect" means that the coupling involves intermediary qudits. Thus, two qudits 102 that are not directly coupled are still indirectly coupled through a chain of two more direct couplings. Therefore, each qudit 102 in the quantum system 100 is coupled, either directly or indirectly, to every other qudit 102 in the quantum system 100. It is not necessary that the quantum system 100 include both nearest-neighbor couplings 110 and long-range couplings 120. For example, the quantum system 100 may have only nearest-neighbor couplings 110 and no long-range couplings 120. In another example, the quantum system 100 only has long-range couplings 120 and no nearest-neighbor couplings 110.

Each of the qudits 102 is a quantum particle that, in the absence of the couplings 110 and 120, has at least d discrete internal energy levels that can be used to represent quantum information, where d is an integer greater than or equal to 2. When d=2, each of the qudits 102 is, or approximates, a qubit. When d=3, each of the qudits 102 is, or approximates, a qutrit. More generally, the present embodiments can be implemented with qudits 102 having any value of d≥2. Furthermore, each of the qudits 102 may have more internal energy levels than necessary to represent quantum information (e.g., a quantum particle with d=3 can be used as a qubit). Examples of the qudits 102 include, but are not limited to, ultracold atoms, Rydberg atoms, trapped ions, electrons, atomic nuclei, superconducting circuits (e.g., phase, charge, and flux qubits), defects in diamond (e.g., nitrogen vacancies), photons, electromagnetic cavities (e.g., optical or microwave), or a combination thereof.

The qudits 102 may be any combination of bosons and fermions. In some embodiments, all of the qudits 102 are bosons. In one of these embodiments, the quantum system 100 is, or approximates, a free boson system that contains only two-body couplings and no higher-order couplings. In this case, the Hamiltonian of the quantum system 100 can be diagonalized to identify quasiparticles. In other embodiments, all of the qudits 102 are fermions. In one of these embodiments, the quantum system 100 is, or approximates, a free fermion system.

Figure 2:
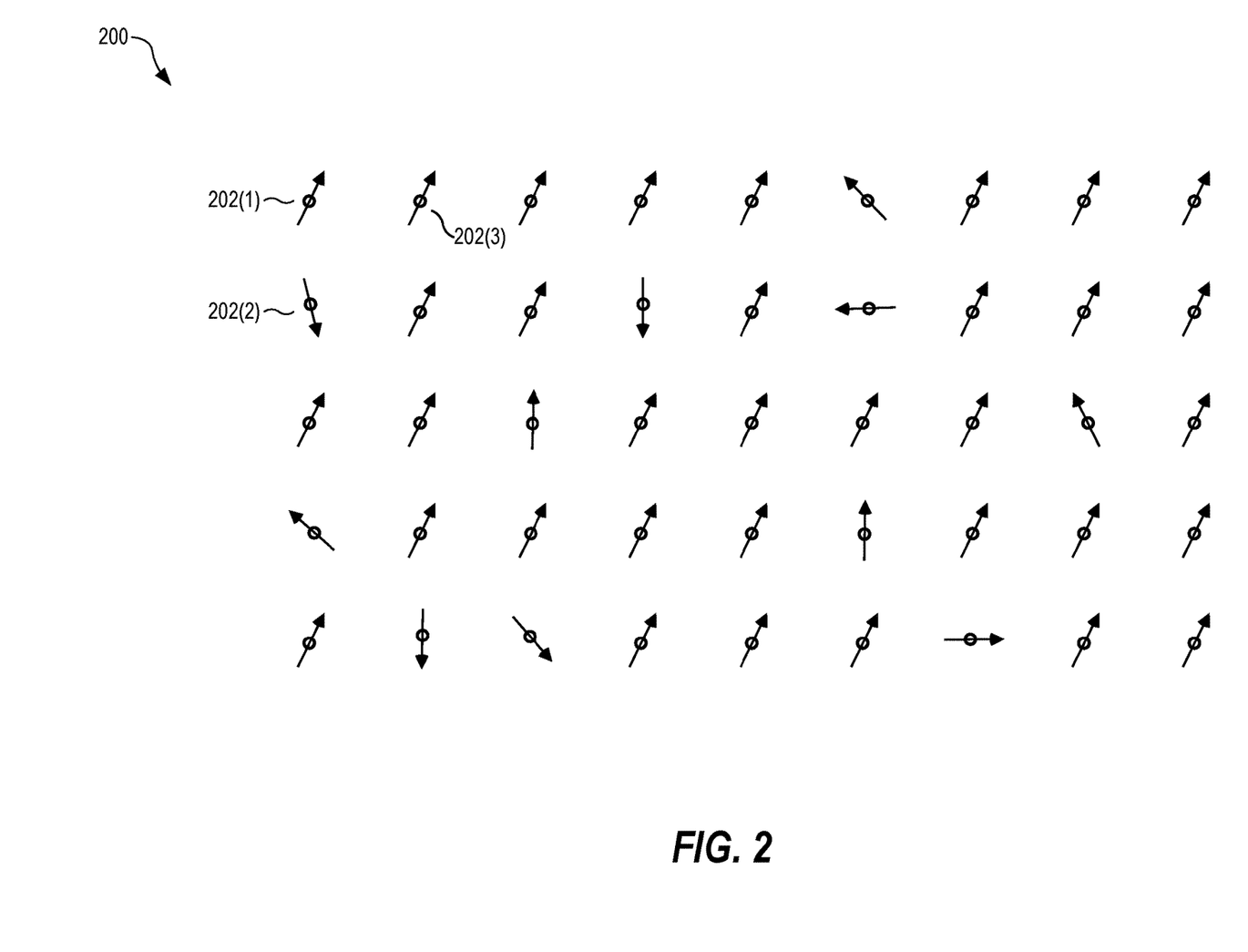
FIG. 2 illustrates a multi-spin quantum system that is an example of the multi-partite quantum system of FIG. 1.

FIG. 2 illustrates a multi-spin quantum system 200 formed from interacting spins 202. The quantum system 200 is an example of the multi-partite quantum system 100 of FIG. 1. Each of the spins 202 is a qubit, and therefore an example of a qudit 102 for the case of d=2. The spins 202 interact with each other via spatial overlap of their wavefunctions, giving rise to nearest-neighbor couplings and long-range couplings like those shown in FIG. 1. Generally, the strength of these interactions, and hence the coupling strength, decreases with increasing distance. Thus, the spins 202 exhibit inherent coupling, i.e., coupling that arises simply by placing the spins 202 proximate to each other. Each spin 202 may be a quantum particle having a magnetic dipole moment (e.g., an electron), electric dipole moment (e.g., Rydberg atom), or any two internal energy levels whose dynamics can be described by quantum spin.

As a contrast to the spins 202, each of the qudits 102 may be a quantum particle or device without inherent coupling. In this case, the qudits 102 may be placed proximate to each other with negligible interactions therebetween. The quantum system 100 may include couplers that provide coupling between qudits 102. For some types of the qudits 102, such couplers may be controlled (via an electrical signal) to selectively enable and disable coupling between specific pairs of qudits 102. For example, many superconducting qubits have negligible inherent coupling, and circuits using superconducting qubits include elements that introduce coupling. Such elements may be as a simple as a passive capacitor or transmission line. One such element that is controllable is a Josephson junction. When the Josephson junction is activated, it generates a magnetic field that shifts the energies of the qubits' internal levels out of resonance with the energy levels of a neighboring qubit, thereby making coupling therebetween negligible. Other examples of quantum particles without inherent coupling include electromagnetic cavities. For example, microwave cavities can be coupled to each other using transmission lines or waveguides. As another example, optical cavities can be coupled to each other using optical fibers or free-space coupling.

Figure 3:
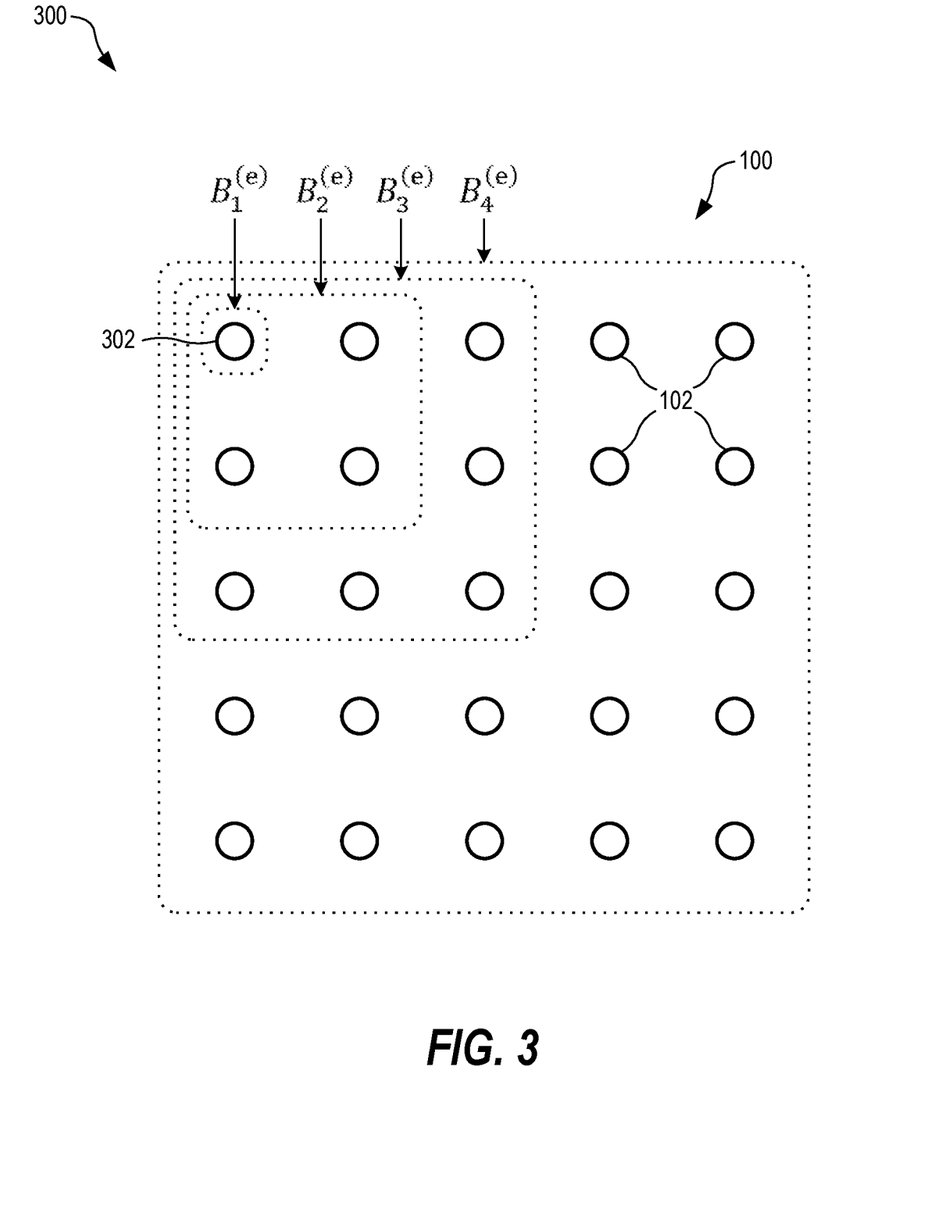
FIG. 3 illustrates a method for quantum state transfer that can be implemented with the multi-partite quantum system of FIG. 1, in embodiments.

FIG. 3 illustrates a method 300 for quantum state transfer that can be implemented with the quantum system 100 of FIG. 1. The method 300 iteratively spreads an initial quantum state from an initial qudit 302 over a sequence of expanding domains. For clarity, it is assumed in the following discussion that each of the qudits 102 is a qubit with computational basis states $|0\rangle$ and $|1\rangle$. However, those trained in the art should recognize how to implement the method 300 with other types of qudits. Also for clarity, the couplings 110 and 120 between qudits 102 are not shown.

In FIG. 3, the qudits 102 are grouped into an expanding sequence $B^{(e)}$ of N domains. Mathematically, this expanding sequence $B^{(e)}$ can be denoted:

$$B^{(e)} = (B_i^{(e)})_{i=1}^{N} = (B_1^{(e)}, B_2^{(e)}, \ldots, B_{N-1}^{(e)}, B_N^{(e)}) \qquad (1)$$

where $B_i^{(e)}$ denotes the $i^{th}$ domain, i is an index that runs from 1 to N, and the superscript "e" indicates expansion. Each domain $B_i^{(e)}$ is a connected subset of the qudits 102, where "connected" means that each qudit 102 in the domain $B_i^{(e)}$ is coupled, either directly or indirectly, to every other qudit 102 in the domain $B_i^{(e)}$. The domains are "expanding" in that each one is a superset of all preceding domains of the sequence $B^{(e)}$ and a subset of all subsequent domains of the sequence $B^{(e)}$. Thus, the expanding domains satisfy $$B_1^{(e)} \subset B_2^{(e)} \subset \ldots \subset B_{N-1}^{(e)} \subset B_N^{(e)}. \qquad (2)$$

While Eqn. 2 shows each domain $B_i^{(e)}$ as a proper subset of all subsequent domains, one or more of the domains may be equal to one or more subsequent domains provided that the first domain $B_1^{(e)}$ is a proper subset of the final domain $B_N^{(e)}$.

In FIG. 3, the first domain $B_1^{(e)}$ of the expanding sequence $B^{(e)}$ includes only an initial qudit 302. The second domain $B_2^{(e)}$ has four qudits 102, one of which is the initial qudit 302. Similarly, the third domain $B_3^{(e)}$ has nine qudits 102, including all four qudits 102 belonging to the second domain $B_2^{(e)}$. Finally, the fourth domain $B_4^{(e)}$ has twenty-five qudits 102, including all nine qudits 102 belonging to the third domain $B_3^{(e)}$. While N=4 for the example of FIG. 3, a different value of N may be used without departing from the scope hereof. The value of N may be chosen based on the overall number of qudits 102, distances between qudits 102, couplings between qudit 102, type of qudits 102, and other parameters.

The method 300 includes iteratively applying a sequence $U^{(e)}$ of N−1 quantum circuits to the qudits 102. The sequence $U^{(e)}$ can be represented mathematically as $$U^{(e)} = (U_i^{(e)})_{i=1}^{N-1} = (U_1^{(e)}, U_2^{(e)}, \ldots, U_{N-1}^{(e)}). \qquad (3)$$

In each iteration, a quantum circuit $U_i^{(e)}$ is applied to one or more of the qudits 102 belonging the domain $B_{i+1}^{(e)}$. Each quantum circuit implements any combination of quantum logic gates, initialization, coupling, and measurements. In some embodiments, each quantum circuit implements a unitary transformation. Since a unitary transformation is reversible, the effect of the quantum circuit is deterministic. In other embodiments, each quantum circuit is probabilistic (e.g., being based on the outcome of a measurement performed with the qudits 102).

At the beginning of the method 300, the initial qudit 302 is in an initial state $|\Psi_0\rangle = \alpha|0\rangle + \beta|1\rangle$, where $\alpha$ and $\beta$ are complex coefficients satisfying $|\alpha|^2 + |\beta|^2 = 1$. All of the other qudits 102 have been initialized into the $|0\rangle$ state. In the first iteration of the sequence $U^{(e)}$, the first quantum circuit $U_1^{(e)}$ is applied to the qudits 102 belonging to the second domain $B_2^{(e)}$ to transform these qudits 102 into a first expanded state $|\Psi_1\rangle$ that is a superposition of a W state and a multi-partite all-zero state. Mathematically, this transformation can be expressed as $$|\psi_1\rangle = U_1^{(e)}(|\psi_0\rangle \otimes |000\rangle) \qquad (4)$$
$$= U_1^{(e)}(\alpha|0000\rangle + \beta|1000\rangle)$$
$$= \alpha U_1^{(e)}|0000\rangle + \beta U_1^{(0)}|1000\rangle)$$
$$= \alpha|Z_1\rangle + \beta|W_1\rangle,$$

where $|W_1\rangle = (|1000\rangle + |0100\rangle + |0010\rangle + |0001\rangle)/2$ is a first W state formed from the four qudits 102 belonging to the second domain $B_2^{(e)}$ and $|Z_1\rangle = |0000\rangle$ is a first all-zero state that is also formed from the four qudits 102 belonging to the second domain $B_2^{(e)}$. The first W state is maximally entangled, meaning that its constituent terms have equal coefficients. When $\alpha=0$ and $\beta=1$, the first quantum circuit $U_1^{(e)}$ transforms the initial state $|\Psi_0\rangle = |1\rangle$ into the W state $|W_1\rangle$. When $\alpha=1$ and $\beta=0$, the first quantum circuit $U_1^{(e)}$ transforms the initial state $|\Psi_0\rangle = |0\rangle$ into the all-zero state $|Z_1\rangle$. More generally, a maximally entangled W state $|W\rangle$ formed from n qubits can be represented mathematically as $$|W\rangle = \frac{|100\ldots0\rangle + |010\ldots0\rangle + \ldots + |000\ldots1\rangle}{\sqrt{n}} \qquad (5)$$

while an all-zero state $|Z\rangle$ formed from n qubits can be represented mathematically as $$|Z\rangle = |0\rangle^{\otimes n} = |0\rangle \otimes |0\rangle \otimes \ldots \otimes |0\rangle. \qquad (6)$$

In the second iteration of the sequence $U^{(e)}$, the second quantum circuit $U_2^{(e)}$ is applied to the qudits 102 belonging to the third domain $B_3^{(e)}$ to transform these qudits 102 into a second expanding state $|\Psi_2\rangle$ that is also a superposition of a W state and an all-zero state. Mathematically, $$|\Psi_2\rangle = U_2^{(e)}((\alpha|Z_1\rangle + \beta|W_1\rangle) \otimes |00000\rangle) = \alpha|z_2\rangle + \beta|W_2\rangle. \qquad (7)$$

In Eqn. 7, $|W_2\rangle$ is a second W state formed from the nine qudits 102 belonging to the domain $B_3^{(e)}$ and $|Z_2\rangle = |000000000\rangle$ is a second all-zero state that is also formed from the nine qudits 102 belonging to the domain $B_3^{(e)}$.

In the $i^{th}$ iteration of the sequence $U^{(e)}$, the $i^{th}$ quantum circuit $U_i^{(e)}$ is applied to the qudits 102 belonging to the domain $B_{i+1}^{(e)}$ to transform these qudits 102 into an $i^{th}$ expanded state $|\Psi_i\rangle$ that is also a superposition of an $i^{th}$ W state and an $i^{th}$ all-zero state, or $$|\Psi_i\rangle = U_i^{(e)}((\alpha|W_{i-1}\rangle + \beta|Z_{i-1}\rangle) \otimes |Z_{i'}\rangle) = \alpha|W_i\rangle + \beta|Z_i\rangle. \qquad (8)$$

In Eqn. 8, $|Z_{i'}\rangle$ is an all-zero state of the qudits 102 that are new to the domain $B_{i+1}^{(e)}$, i.e., the qudits 102 that belong to the domain $B_{i+1}^{(e)}$ and do not belong to the preceding domain $B_i^{(e)}$. Thus, the state $|Z_{i'}\rangle$ is the product of the initial state $|0\rangle$ of each of the new qubits. As can be seen from Eqn.

8, the input to the quantum circuit $U_i^{(e)}$ is the product of (i) the intermediate quantum state $|\Psi_i\rangle = \alpha|W_{i-1}\rangle + \beta|Z_{i-1}\rangle$ generated by the preceding quantum circuit $U_{i-1}^{(e)}$ and (ii) the all-zero state $|Z_i\rangle$.

In the last iteration of the sequence $U^{(e)}$, the final quantum operator $U_{N-1}^{(e)}$ is applied to the qudits 102 belonging to the final domain $B_N^{(e)}$ to obtain a maximally expanded state $|\Psi_{N-1}\rangle = \alpha|W_{N-1}\rangle + \beta|Z_{N-1}\rangle$ that is a superposition of a maximum W state $|W_{N-1}\rangle$ and a maximum all-zero state $|W_{N-1}\rangle$. The state $|\Psi_{N-1}\rangle$ is "maximally expanded" in that it involves more entangled qudits 102 than any of the other expanded states $|\Psi_1\rangle, |\Psi_2\rangle, \ldots, |\Psi_{N-2}\rangle$.

When the qudits 102 do not possess intrinsic coupling, each quantum circuit may control one or more couplers to couple the qudits 102 (i.e., "turn on" the couplings), adjust coupling strengths, and decouple the qudits 102 (i.e., "turn off" the couplings). In some embodiments of the method 300, the quantum circuit $U_i^{(e)}$ generates a plurality of pair-wise couplings between (i) one or more of the qudits 102 that belong to the previous domain $B_i^{(e)}$ and (ii) one or more of the qudits 102 that belong to the domain $B_{i+1}^{(e)}$ and are excluded from the previous domain $B_i^{(e)}$. The plurality of pair-wise couplings may be generated simultaneously. The pair-wise couplings may fully connect the (i) one or more of the qudits 102 that belong to the previous domain $B_i^{(e)}$ and the (ii) one or more of the qudits 102 that belong to the domain $B_{i+1}^{(e)}$ and are excluded from the previous domain $B_i^{(e)}$. In other embodiments, the qudits 102 possess intrinsic coupling. In these embodiments, the method 300 may exclude the turning on and off of pair-wise couplings.

In some embodiments, the plurality of qudits 102 form a lattice with dimension d. The number of the qudits belonging to the domain $B_i^{(e)}$ is approximately $2^d$ times the number of the qudits belonging to the previous domain $B_{i-1}^{(e)}$. For example, in FIG. 3, where d=2, the four qudits in $B_2^{(e)}$ is exactly four times the number of qudits in $B_1^{(e)}$, the nine qudits in $B_3^{(e)}$ is approximately four times the number of qudits in $B_2^{(e)}$, and the twenty-five qudits in $B_4^{(e)}$ is approximately four times the number of qudits in $B_3^{(e)}$. As can be seen from this example, this increase in the number of qudits by a factor of $2^d$ from each domain to the next need not be exact.

In other embodiments, the method 300 further includes assigning each of the qudits 102 to one or more of the expanding domains $B_i^{(e)}$. In some embodiments, the method 300 includes initializing, prior to said iteratively spreading, the initial qudit 302 to have the initial quantum state $|\Psi_0\rangle$. In one of these embodiments, the method 300 includes initializing, prior to said iteratively spreading, all of the qudits 102, except the initial qudit 302, into a local eigenstate. For example, when the qudits 102 are qubits, the local eigenstate may be the computational basis state $|0\rangle$.

In some embodiments, the method 300 further includes initializing the initial qudit 302 into the initial state $|\Psi_0\rangle = |1\rangle$. In this case, the maximally expanded state $|\Psi_{N-1}\rangle$ is approximately the maximum W state $|W_{N-1}\rangle$ (i.e., the maximum all-zero state $|Z_{N-1}\rangle$ is negligible and therefore can be ignored). The method 300 may then further include generating a single photon with the maximum W state $|W_{N-1}\rangle$. Compared to other types of entangled states, W states can be converted more easily into single photons because they couple to light with a coupling constant that can be collectively enhanced (e.g., by the square-root of the number of qudits 102). In other embodiments, the method 300 further includes receiving a single photon with the qudits 102 forming the maximum W state $|W_{N-1}\rangle$. Thus, these embodiments can be used to create a matter-photon interface. Such an interface may form part of a quantum repeater or quantum network.

In another application, the method 300 is used to convert between W states and localized excitations to process photonic states. An example of how such a conversion may be implemented can be found in Christine A. Muschik et al., "Quantum Processing Photonic States in Optical Lattices", Phys Rev. Lett. 100, 063601.

Figure 4:
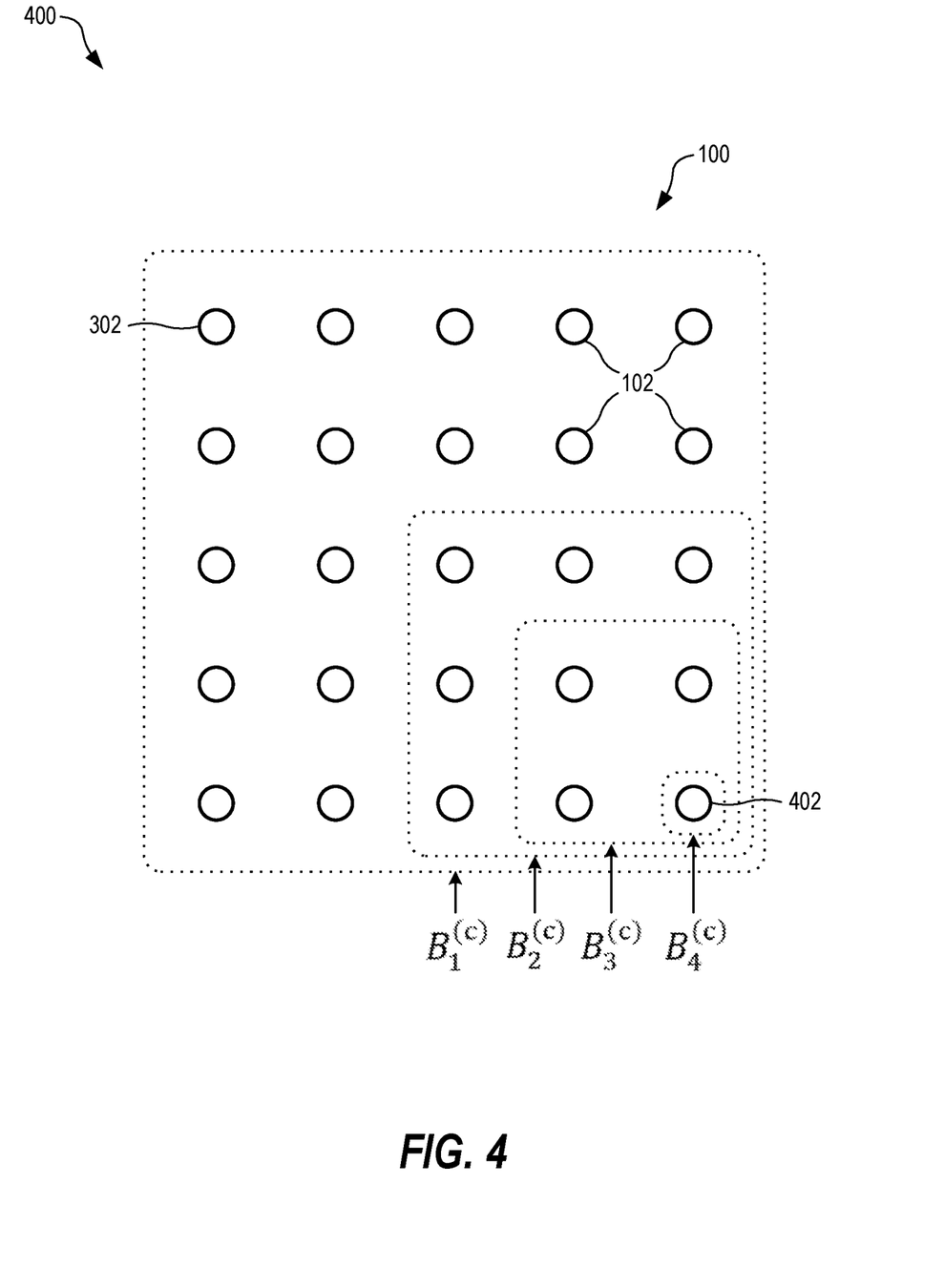
FIG. 4 illustrates another method for quantum state transfer that can be implemented with the multi-partite quantum system of FIG. 1, in embodiments.

FIG. 4 illustrates a method 400 for quantum state transfer that can be implemented with the quantum system 100 of FIG. 1. The method 400 extends the method 300 of FIG. 3 by iteratively compressing the maximally expanded state $|\Psi_{N-1}\rangle$ over a sequence of contracting domains. The method 400 can be used to transfer the initial quantum state $|\Psi_0\rangle$ from the initial qudit 302 to a final qudit 402. Similar to the above discussion for FIG. 3, it is assumed in the following discussion that each of the qudits 102 is a qubit with computational basis states $|0\rangle$ and $|1\rangle$. Those trained in the art should recognize how to implement the method 400 with other types of qudits. Similarly, the couplings 110 and 120 between the qudits 102 are not shown in FIG. 4.

In FIG. 4, the qudits 102 are grouped into a contracting sequence $B^{(c)}$ of M domains. Mathematically, the contracting sequence $B^{(c)}$ can be expressed as $$B^{(c)} = (B_i^{(c)})_{i=1}^M = (B_1^{(c)}, B_2^{(c)}, \ldots, B_{M-1}^{(c)}, B_M^{(c)}), \quad (9)$$

where $B_i^{(c)}$ denotes the $i^{th}$ domain, i is an index that runs from 1 to M, and the superscript "c" indicates contraction. Each domain $B_i^{(c)}$ is a connected subset of the qudits 102. The domains are "contracting" in that each one is a subset of all preceding domains of the sequence $B^{(c)}$ and a subset of all subsequent domains of the sequence $B^{(c)}$. Thus, the contacting domains satisfy $$B_1^{(c)} \supset B_2^{(c)} \supset \ldots \supset B_{M-1}^{(c)} \in B_M^{(c)}. \quad (10)$$

While Eqn. 10 shows each domain $B_i^{(c)}$ as a proper superset of all subsequent domains, one or more of the domains may be equal to one or more subsequent domains provided that the first domain $B_1^{(c)}$ is a proper superset of the final domain $B_N^{(c)}$.

In FIG. 4, the first domain $B_1^{(c)}$ of the contracting sequence $B^{(c)}$ includes all of the qudits 102 of the final domain $B_N^{(e)}$ of the expanding sequence $B^{(e)}$. The domain $B_1^{(c)}$ is the only domain of the sequence $B^{(c)}$ that contains the initial qudit 302. The second domain $B_2^{(c)}$ has nine qudits 102, the third domain $B_3^{(c)}$ has four qudits 102, and the fourth domain $B_4^{(c)}$ contains only the final qudit 402. While M=4 for the example of FIG. 4, a different value of M may be used without departing from the scope hereof. The value of M may be chosen based on the overall number of qudits 102, distances between qudits 102, couplings between qudit 102, type of qudits 102, and other parameters. It is possible, although not necessary, for M to equal to the same value of N used for the method 300.

In the method 400, the method 300 is first used to generate the maximally expanded state $|\Psi_{N-1}\rangle$. A sequence $U^{(c)}$ of M-1 quantum circuits is then applied iteratively to the qudits 102. The sequence $U^{(c)}$ can be represented mathematically as $$U^{(c)} = (U_i^{(c)})_{i=1}^{M-1} = (U_1^{(c)}, U_2^{(c)}, \ldots, U_{M-1}^{(c)}). \quad (11)$$

In each iteration, a quantum circuit $U_i^{(c)}$ is applied to one or more of the qudits 102 belonging the domain $B_i^{(c)}$. When the qudits 102 do not possess intrinsic coupling, the action of a quantum circuit may include controlling one or more couplers to couple the qudits 102, adjust coupling strengths, and decouple the qudits 102. When the qudits 102 possess intrinsic coupling, the action of a quantum circuit may exclude the turning on and off of couplings.

In the first iteration of the sequence $U^{(c)}$, the first quantum circuit $U_1^{(c)}$ is applied to the twenty-five qudits 102 belonging to the first domain $B_1^{(c)}$ to transform these qudits 102 from the maximally expanded state $|\Psi_{N-1}\rangle$ into a first contracted state $|\Psi_1\rangle$ that is a superposition of a W state and a multi-partite all-zero state. Mathematically, $$|\psi'_1\rangle = U_1^{(c)}|\psi_{N-1}\rangle \qquad (12)$$
$$= U_1^{(c)}(\alpha|Z_{N-1}\rangle + \beta|W_{N-1}\rangle)$$
$$= \alpha U_1^{(c)}|Z_{N-1}\rangle + \beta U_1^{(c)}|W_{N-1}\rangle$$
$$= (\alpha|Z'_1\rangle + \beta|W'_1\rangle) \otimes |Z^*_1\rangle$$

where $|W'_1\rangle$ is a first W state formed from the qudits 102 belonging to the second domain $B_2^{(c)}$ and $|Z'_1\rangle$ is a first all-zero state formed from the qudits 102 belonging to the second domain $B_2^{(c)}$. The qudits 102 that belong to the first domain $B_1^{(c)}$ but are excluded from the second domain $B_2^{(c)}$ are called separated qudits 102, and the quantum circuit $U_1^{(c)}$ decouples these separated qudits 102 such that they are no longer entangled with the other qudits 102. Each separated qudit 102 is in the state $|0\rangle$, and collectively these separated qudits are indicated in Eqn. 12 with the all-zero state $|Z^*_1\rangle$. The separated qudits 102 are no longer needed, and therefore may be ignored or repurposed.

In the second iteration of the sequence $U^{(c)}$, the second quantum circuit $U_2^{(c)}$ is applied to the nine qudits 102 belonging to the second domain $B_2^{(c)}$ to transform these qudits 102 into a second contracting state $|\Psi_2\rangle$ that is also a superposition of a W state and an all-zero state. Ignoring the separated qudits in Eqn. 12, the second quantum circuit $U_2^{(c)}$ is applied to only those qudits 102 in the state $\alpha|Z'_1\rangle + \beta|W'_1\rangle$. Mathematically, $$|\Psi'_2\rangle = U_2^{(c)}(\alpha|Z'_1\rangle + \beta|W'_1\rangle) = (\alpha|Z'_2\rangle + \beta|W'_2\rangle) \otimes |Z^*_2\rangle \qquad (13)$$

where $|W'_2\rangle$ is a second W state formed from the four qudits 102 belonging to the third domain $B_3^{(c)}$, $|Z'_2\rangle = |0000\rangle$ is a second all-zero state formed from the four qudits 102 belonging to the third domain $B_3^{(c)}$, and $|Z^*_2\rangle$ represents qudits 102 in the domain $B_2^{(c)}$ that have been separated. Again, the separated qudits are no longer needed and therefore can be ignored or repurposed.

In the $i^{th}$ iteration of the sequence $U^{(c)}$, the $i^{th}$ quantum circuit $U_i^{(c)}$ is applied to the qudits 102 belonging to the domain $B_i^{(c)}$ to transform these qudits 102 into an $i^{th}$ contracting state $|\Psi'_i\rangle$. Mathematically, $$|\Psi'_i\rangle = U_i^{(c)}(\alpha|Z'_{i-1}\rangle + \beta|W'_{i-1}\rangle) = (\alpha|Z'_i\rangle + \beta|W'_i\rangle) \otimes |Z^*_i\rangle \qquad (13)$$

where $|W'_i\rangle$ is an $i^{th}$ W state formed from the qudits 102 belonging to the domain $B_i^{(c)}$, $|Z'_i\rangle$ is an $i^{th}$ all-zero state formed from the qudits 102 belonging to the domain $B_i^{(c)}$, and $|Z^*_i\rangle$ represents qudits 102 in the domain $B_i^{(c)}$ that have been separated.

In the last iteration of the sequence $U^{(c)}$, the final quantum operator $U_{M-1}^{(c)}$ is applied to the qudits 102 belonging to the final domain $B_{M-1}^{(c)}$. After ignoring additional separated qudits, the final qudit 402 is in a final quantum state $|\Psi_f\rangle$ that approximates the initial quantum state $|\Psi_0\rangle$, i.e., $|\Psi_f\rangle \approx |\Psi_0\rangle$. Thus, the method 400 spatially transfers the initial quantum state $|\Psi_0\rangle$ across the distance between the initial qudit 302 and the final qudit 402.

In FIG. 4, the method 400 compresses the same qudits 102 that were used for spreading in FIG. 3. However, spreading and compression may use at least partially different sets of qudits 102. Accordingly, in some embodiments the method 400 includes assigning each of a first plurality of qudits to one or more of the expanding domains, and assigning each of a second plurality of qudits to one or more of the contracting domains. Both the initial qudit 302 and final qudit 402 belong to both the first and second pluralities of qudits. Accordingly, there are at least two qudits common to both the first and second pluralities of qudits. In one embodiment, the second plurality of qudits is the same as the first plurality of qudits.

In FIG. 3, the initial qudit 302 lies on a boundary each of the domains $B_i^{(e)}$, including the largest domain $B_{N-1}^{(e)}$. Similarly, in FIG. 4, the final qudit 402 lies on a boundary of each of the domains $B_i^{(c)}$, including the largest domain $B_1^{(c)}$ However, it is not necessary for the initial qudit 302 to lie on any boundary, except for the first domain $B_1^{(e)}$ when the initial qudit 302 is the only qudit belonging thereto. Similarly, it is not necessary for the final qudit 402 to lie on any boundary, except for the last domain $B_M^{(c)}$ when the final qudit 402 is the only qudit belonging thereto. Accordingly, in some embodiments of the methods 300 and 400, one or both of the qudits 302 and 402 do not lie on the boundary of the largest domain. In another embodiment, the initial qudit 302 lies on the boundary of only the first domain $B_1^{(e)}$ and the final qudit 402 lies on the boundary of only the last domain $B_M^{(c)}$.

In some embodiments, the plurality of qudits 102 form a lattice with dimension d. The number of the qudits belonging to the domain $B_i^{(c)}$ is approximately $2^{-d}$ times the number of the qudits belonging to the previous domain $B_{i-1}^{(c)}$. For example, in FIG. 4, where d=2, the twenty-five qudits in $B_1^{(c)}$ is approximately four times the number of qudits in $B_2^{(c)}$, the nine qudits in $B_2^{(c)}$ is approximately four times the number of qudits in $B_3^{(c)}$, and the four qudits in $B_3^{(c)}$ is exactly four times the number of qudits in $B_4^{(c)}$. As can be seen from this example, this reduction of the number of qudits by the factor $2^{-d}$ from each domain to the next need not be exact.

To better understand the quantum circuits used in the present embodiments, consider a many-body quantum system defined on a d-dimensional lattice graph $\Lambda$ of qudits (such as the quantum system 100 of FIG. 1 or the quantum system 200 of FIG. 2). The Hamiltonian of this quantum system may take the form $$H(t) = \sum_{i,j \in \Lambda} h_{ij}(t) c_i^\dagger c_j \qquad (15)$$

where $h(t): \mathbb{R} \to \mathbb{C}^{\Lambda \times \Lambda}$ is a Hermitian matrix, and $c_i^\dagger$ and $c_i$ represent either the fermionic creation and annihilation operators obeying $$\{c_j, c_i^\dagger\} = \delta_{ij} \qquad (16)$$

or the bosonic creation and annihilation operators obeying $$[c_j, c_i^\dagger] = \delta_{ij}. \qquad (17)$$

The time-dependence of the matrix h(t) reflects the turning on and off of pair-wise couplings between pairs of the qudits. The diagonal elements $h_{ii}$ do not participate in spreading and compression and therefore may be ignored. The on-site Hilbert space $\mathcal{H}_i$ obeys $\dim(\mathcal{H}_i)=2$ in the fermionic case and $\dim(\mathcal{H}_i)=\infty$ in the bosonic case. However, in isolated bosonic systems $\mathcal{H}_i$ can often be truncated so that $\dim(\mathcal{H}_i)$ is at most the number of excitations on the lattice and is therefore finite.

As known in the art, the evolution of all operators in such a non-interacting theory is controlled by the Green's function of the single particle problem on the Hilbert space $\mathbb{C}^\Lambda$. Time evolution on this space is generated by the Hamiltonian $$H_{sp}(t) = \sum_{i,j \in \Lambda} h_{ij}(t) |1_i\rangle\langle 1_j|, \qquad (18)$$

where $|1_i\rangle$ denotes the many-body quantum state having one excitation at site $i \in \Lambda$ and no excitations at all other sites. The single particle time evolution matrix obeys the differential equation $$\frac{d}{dt} U_{sp}(t) = -i H_{sp}(t) U_{sp}(t), \qquad (19)$$

together with the initial condition $U_{sp}(0)=1$. For example, in the fermionic model, $$c_i(t) = \sum_{j \in \Lambda} U_{sp,ij}(t) c_j, \qquad (20)$$

from which it follows that $$\frac{d}{dt} c_i = i[H(t), c_i] = \sum_{j \in \Lambda} i h_{ij}(t) [c_i^\dagger c_j, c_i] = i \sum_{j \in \Lambda} h_{ij}(t) c_j. \qquad (21)$$

Next, let A and B be two disjoint subsets of $\Lambda$ and $0 < C < \infty$. If $$|\psi(0)\rangle = \frac{1}{\sqrt{|A|}} \sum_{i \in A} |1_i\rangle \qquad (22)$$

then there exists a free-particle Hamiltonian H(t) defined in Eqn. 15 with $|h_{ij}| \le C$ for all $i, j \in \Lambda$ such that for any $\theta \in \mathbb{R}$ $$|\psi(T)\rangle \propto \frac{\cos\theta}{\sqrt{|A|}} \sum_{i \in A} |1_i\rangle + \frac{\sin\theta}{\sqrt{|B|}} \sum_{i \in B} |1_i\rangle \qquad (23)$$

at time $$T \le \frac{\pi}{2C\sqrt{|B||A|}}. \qquad (24)$$

This assertion can be proven by construction. Consider the Hamiltonian $$H_e(t) = \text{sgn}(\tan\theta) \sum_{k \in A} \sum_{j \in B} i \, C (|1_j\rangle\langle 1_k| - |1_k\rangle\langle 1_j|). \qquad (25)$$

Without loss of generality, we take $\theta \in [0, \pi/2]$; the generalization to other values of $\theta$ is straightforward. By permutation symmetry, the wave function takes the form of Eqn. 23 with $\theta(t)$ a function of time. Pick any $j \in B$. We can explicitly evaluate $$\frac{d\theta}{dt} = \frac{\sqrt{|B|}}{\cos\theta} \frac{d\langle j|\psi(t)\rangle}{dt} = -i \frac{\sqrt{|B|}}{\cos\theta} \langle j|H_e|\psi(t)\rangle = C\sqrt{|B||A|}. \qquad (26)$$

Since the value of $\theta$ at which $|\Psi(t)\rangle$ is given by Eqn. 23 is in the range $[0, \pi/2]$, we conclude that Eqn. 26 implies Eqn. 24.

The state $|\Psi(0)\rangle^{\mathcal{F}}$ of Eqn. 22 is a maximally entangled W state formed from the qudits in the set A. For $\theta = \pi/4$, the state $|\Psi(T)\rangle$ of Eqn. 23 gives a maximally entangled W state formed from the qubits in the set A+B. For $\theta = \pi/2$, $|\Psi(T)\rangle$ is a maximally entangled W state formed from the qubits in the set B For other values of $\theta$, $|\Psi(T)\rangle$ is a partially entangled W state formed from the qubits in the set A+B.

The Hamiltonian $H_e$ of Eqn. 23 is an example of the Hamiltonian H(t) of Eqn. 15, i.e., a Hamiltonian that transforms the state $|\Psi(0)\rangle$ of Eqn. 22 into the state $|\Psi(T)\rangle$ of Eqn. 23. Those trained in the art will recognize that other Hamiltonians can produce similar transformations. In particular, the Hamiltonian $H_e$ fully couples the qubits of the set A with the qubits of the set B, where "fully couples" means that each of the qubits in the set A is directly two-body coupled to each of the qubits in the set B. Fully coupled qubits generally gives the fastest transformation times. However, the present embodiments do not require the qubits to be fully coupled (i.e., some of the qubits may be indirectly coupled, as described above).

The Hamiltonian H(t) has no effect on a multi-zero state. Therefore, for each iteration i of iteratively spreading, the respective quantum circuit $U_i^{(e)}$ implements a Hamiltonian of the form shown in Eqn. 15. Furthermore, when $|\Psi(0)\rangle$ is a maximally entangled W state over the qubits of A+B, the Hamiltonian $H_e$ will transform this state into a maximally entangled W state over just the qubits of B. Therefore, any Hamiltonian H(t) of Eqn. 15 used for spreading can also be used for compression.

Those trained in the art will recognize how to experimentally implement a Hamiltonian of the form shown in Eqn. 15. The details of any implementation depend on the type of qudits used. For example, when the qudits are superconducting circuits, a pair of such superconducting circuits may be coupled together using a capacitor, transmission line, or cavity bus. In this case, one or both of superconducting circuits may be detuned to effectively turn off the coupling. Alternatively, a DC SQUID or Josephson junction (e.g., flux biased or current biased) may be used to controllably couple the qudits. In any case, a coupler between the $i^{th}$ qudit and $j^{th}$ qudit of the quantum system 100 can be described mathematically as the term $h_{ij}$ of the Hamiltonian H(t) of Eqn. 15. Accordingly, the full Hamiltonian H(t) can be experimentally realized by coupling pairs of the qudits 102 and controlling these couplings over time.

As another example, the qudits 102 may be a chain of trapped ions. Two internal energy states of each ion serve as the computational basis states $|0\rangle$ and $|1\rangle$. A laser pulse couples a first ion to a collective motional mode of the chain. The same laser pulse also couples the collective motional mode to a second ion. This laser-driven process, referred to as "red-sideband coupling" and "blue-sideband coupling", therefore couples the first and second ions using the collective motional mode as an intermediary. Since these couplings only occur in the presence of laser light, they are inherently controllable. Furthermore, such coupling between a pair of ions can be expressed mathematically as one of the terms $h_{ij}$ in the Hamiltonian H(t) of Eqn. 15 (or, equivalently, one of the terms in the Hamiltonian $H_e$ of Eqn. 25).

For any one of the quantum circuits $U_i^{(e)}$ and $U_i^{(c)}$, the couplings may be applied simultaneously, sequentially, or a combination thereof. Applying the coupling simultaneously usually results in the fastest transfer times. However, in certain physical implementations it may not be possible to simultaneously apply all couplings. In this case, the couplings may be applied sequentially provided that the overall effect of the quantum circuit is unaffected.

One benefit of the method 400 is its remarkable robustness to error. As a heuristic argument for this robustness, consider the case where the number $\mathcal{N}$ of qudits 102 in the domain $B_{i+1}^{(e)}$ is approximately $\mathcal{N} = 2^{di}$. Also assume that these $\mathcal{N}$ qudits are mutually coupled. The method benefits from this mutually coupling via an enhancement in the transfer rate of a factor of $\mathcal{N}$. Consider an uncorrelated random error in h(t). Using random matrix theory, such an error leads to dephasing rates of order $\sqrt{\mathcal{N}_n}$. Denoting $|x\rangle$ as the target site (i.e., the final qudit 402), the loss in fidelity $\mathcal{F} = |\langle \Psi(\tau)|x\rangle|^2$ can be estimated by summing up the error after each step:

$$1 - \mathcal{F} \sim \sum_{n=1}^{m} \frac{\epsilon}{\sqrt{\mathcal{N}_n}} \sim \epsilon \sum_{n=1}^{m} 2^{-dn/2} < \frac{\epsilon}{2^{d/2} - 1}. \quad (27)$$

Here, $\epsilon$ is related to the error in a single coupling. Therefore, the spreading and compression performed by the method 400 is highly immune to imperfections in tunable coupling constants. As $\epsilon \to 0$, the fidelity $\mathcal{F} \to 1$.

The present embodiments also include systems that perform the methods 300 and 400. In one such embodiment, a system for quantum state transfer includes a plurality of qudits and a plurality of couplers that couple the qudits. The qudits may take the form of a quantum register. Each of the couplers may be controllable to directly couple two of the qudits. The system may also include one or more instruments that control any combination of the qudits and couplers to establish coupling between the qudits in accordance with one or both of the methods 300 and 400. These instruments may be specific to the type of qudits employed in the system. For example, when the qudits are superconducting circuits, the instruments may include microwave signal generators or synthesizers that output signals to be applied to the qudits and tunable couplers. When the qudits are trapped atoms or ions, the instruments may include lasers and associated optical components (e.g., modulators) for generating a light beam steering light beam to the trapped atoms or ions. Other types of instruments include, but are not limited to, DC current sources (e.g., for generating magnetic fields with coils) and DC voltage sources (e.g., for driving electrodes). The system may include other instruments without departing from the scope hereof.

The system may also include a computer or controller that controls the instruments according to the quantum circuits described herein. The computer may include a processor and a memory storing machine-readable instructions that, when executed by the processor, control the instruments such that the system performs one or both of the methods 300 and 400. The processor may include one or more of a microprocessor with one or more central processing unit (CPU) cores, a graphics processing unit (GPU), a digital signal processor (DSP), a system-on-chip (SoC), a microcontroller unit (MCU), or another type of circuit that executes instructions to perform logic, control, and input/output operations. The controller may include a field-programmable gate array (FPGA) or other type of hard-wired circuit that is pre-programmed to control the instruments such that the system performs one or both of the methods 300 and 400. The controller may be part of a data acquisition system that processes signals (e.g., measurements of the qudits).

As an example of its use, the system for quantum state transfer may form part of a quantum computer or information processing system. As another example, the system may form part of a device used for quantum communication. Examples of such devices include quantum repeaters, quantum memories, quantum transmitters, and quantum repeaters. More generally, the system may be used in any quantum device or experimental setup in which a quantum state is transferred from one qubit to another.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A method for quantum state transfer, comprising:
   iteratively spreading an initial quantum state from an initial qudit, of a plurality of qudits, over a sequence of expanding domains;
   wherein each iteration of said iteratively spreading includes applying a quantum circuit to the plurality of qudits belonging to a respective expanding domain of the sequence of expanding domains, the quantum circuit transforming the qudits of the respective expanding domain into an intermediate quantum state comprising a superposition of terms, at least one of the terms approximating a W state formed with the qudits of the respective expanding domain.

2. The method of claim 1, wherein each of the plurality of qudits is a qubit.

3. The method of claim 2, wherein each of the plurality of qudits is one of a Rydberg atom, a polar molecule, a trapped ion, a trapped neutral atom, a superconducting circuit, and a defect in a diamond.

4. The method of claim 1, wherein the plurality of qudits approximate a free boson system or a free fermion system.

5. The method of claim 4, wherein the plurality of qudits form one of: an array of coupled microwave cavities, an array of coupled optical cavities, an array of coupled phononic cavities, an array of ultracold bosonic atoms, an array of ultracold fermionic atoms, and an array of spin-polarized electrons.

6. The method of claim 1, wherein said applying the quantum circuit includes generating a plurality of pair-wise couplings between (i) one or more of the qudits that belong to a previous expanding domain of the sequence of expanding domains and (ii) one or more of the qudits that belong to the respective expanding domain and are excluded from the previous expanding domain.

7. The method of claim 6, wherein said generating the plurality of pair-wise couples includes fully connecting (i) the qudits of the previous expanding domain and (ii) the qudits that belong to the respective expanding domain and are excluded from the previous expanding domain.

8. The method of claim 6, where said generating the plurality of pair-wise couplings includes simultaneously generating the plurality of pair-wise couplings.

9. The method of claim 1, wherein:
the plurality of qudits form a lattice having a lattice dimension d; and
a number of the qudits belonging to the respective expanding domain is approximately $2^d$ times a number of the qudits belonging to a previous expanding domain of the sequence of expanding domains.

10. The method of claim 1, wherein:
a final iteration of said iteratively spreading generates a maximally expanded quantum state; and
the method further comprising generating a single photon with the maximally expanded quantum state.

11. The method of claim 1, wherein:
the plurality of qudits form a lattice having a lattice dimension; and
said applying the quantum circuit includes applying the quantum circuit for a duration based at least on the lattice dimension.

12. The method of claim 1, wherein:
for each iteration of said iteratively spreading, the quantum circuit transforms the qudits of the respective expanding domain from a starting quantum state into the intermediate quantum state, the starting quantum state including the intermediate quantum state of a previous iteration of said iteratively spreading; and
for an initial iteration of said iteratively spreading, the starting quantum state includes the initial quantum state.

13. The method of claim 1, further comprising assigning each of the plurality of qudits to one or more of the expanding domains.

14. The method of claim 1, further comprising initializing, prior to said iteratively spreading, the initial qudit to have the initial quantum state.

15. The method of claim 1, further comprising initializing, prior to said iteratively spreading, all of the plurality of qudits, except the initial qudit, into a local eigenstate.

16. The method of claim 1, wherein:
a final iteration of said iteratively spreading generates a maximally expanded quantum state;
the method further comprises iteratively compressing the maximally expanded quantum state over a sequence of contracting domains;
each iteration of said iteratively compressing includes applying a quantum circuit to the plurality of qudits belonging to a respective contracting domain of the sequence of contracting domains, the quantum circuit transforming the qudits of the respective contracting domain into a quantum state comprising a superposition of terms, at least one of the terms approximating a W state formed with the qudits of the respective contracting domain; and
a last iteration of said iteratively compressing transforms a final qudit, of the plurality of qudits, into a final quantum state that approximates the initial quantum state.

17. The method of claim 16, further comprising:
assigning each of the plurality of qudits to one or more of the expanding domains; and
assigning each of the plurality of qudits to one or more of the contracting domains.

18. The method of claim 16, the initial and final qudits both belonging to a largest domain of the sequence of expanding domains and the sequence of contracting domains.

19. The method of claim 18, the initial and final qudits both lying on a boundary of the largest domain.

20. The method of claim 16, a length of the sequence of expanding domains equaling a length of the sequence of contracting domains.

* * * * *